United States Patent [19]

Schuster

[11] Patent Number: 4,544,117
[45] Date of Patent: Oct. 1, 1985

[54] LEADING EDGE FLAP AND BOUNDARY LAYER CONTROL SYSTEM

[75] Inventor: John H. Schuster, Lancaster, Calif.
[73] Assignee: Lockheed Corporation, Burbank, Calif.
[21] Appl. No.: 550,860
[22] Filed: Nov. 14, 1983
[51] Int. Cl.[4] .............................................. B64C 9/26
[52] U.S. Cl. .................................... 244/210; 244/214
[58] Field of Search ............... 244/206, 207, 210, 211, 244/213, 214

[56] References Cited

U.S. PATENT DOCUMENTS

| | | | |
|---|---|---|---|
| 2,381,678 | 8/1945 | Maxwell | 244/211 |
| 3,128,966 | 4/1964 | Alvarez-Calderon | 244/210 |
| 3,556,439 | 1/1971 | Autry | 244/210 |
| 3,897,029 | 7/1975 | Calderon | 244/213 |

FOREIGN PATENT DOCUMENTS 856553 6/1940 France ................................ 244/214

Primary Examiner—Galen L. Barefoot
Assistant Examiner—Paul J. Bednar
Attorney, Agent, or Firm—Louis L. Dachs

[57] ABSTRACT

The invention is a leading edge flap and boundary layer control system for an aircraft wing having a substantially sharp leading edge. The system comprises the wing 10 incorporating a spanwise slot 26 having front and rear guide walls 28, 30. A guide member 44 is rotatably mounted in the wind movable from a retracted position to an extended position. A flap segment 54 is rotatably mounted to the guide member 44 and is movable from a retracted position to an extended position in conjunction with the guide member 44. The flap segment incorporates an aerodynamic surface adapted to form an aerodynamic extension of the leading edge 16 of the wing 10 and, furthermore, cooperating with the guide member 44 to form a smooth transition inlet to the front guide wall 28 of the slot 26. Actuators 66, 72 are provided to actuate the guide member 44 and flap segment 54 from their retracted positions to their extended positions. A door member is rotatably mounted to the rear wall of the slot moveable from an extended position to a retracted position. An actuator 90 is provided to move the door member 62 to the retracted position where it forms a portion of the rear wall 30 of the slot 26. Thus, during normal flight conditions the sharp leading edge and smooth aerodynamic contour is maintained. For landing and takeoff purposes, the flap segment 54 and guide member 44 are extended and the door member 62 is retracted producing an aerodynamic extension of the leading edge and a smooth entrance to the slot is provided for energizing the boundary layer near the leading edge.

6 Claims, 4 Drawing Figures

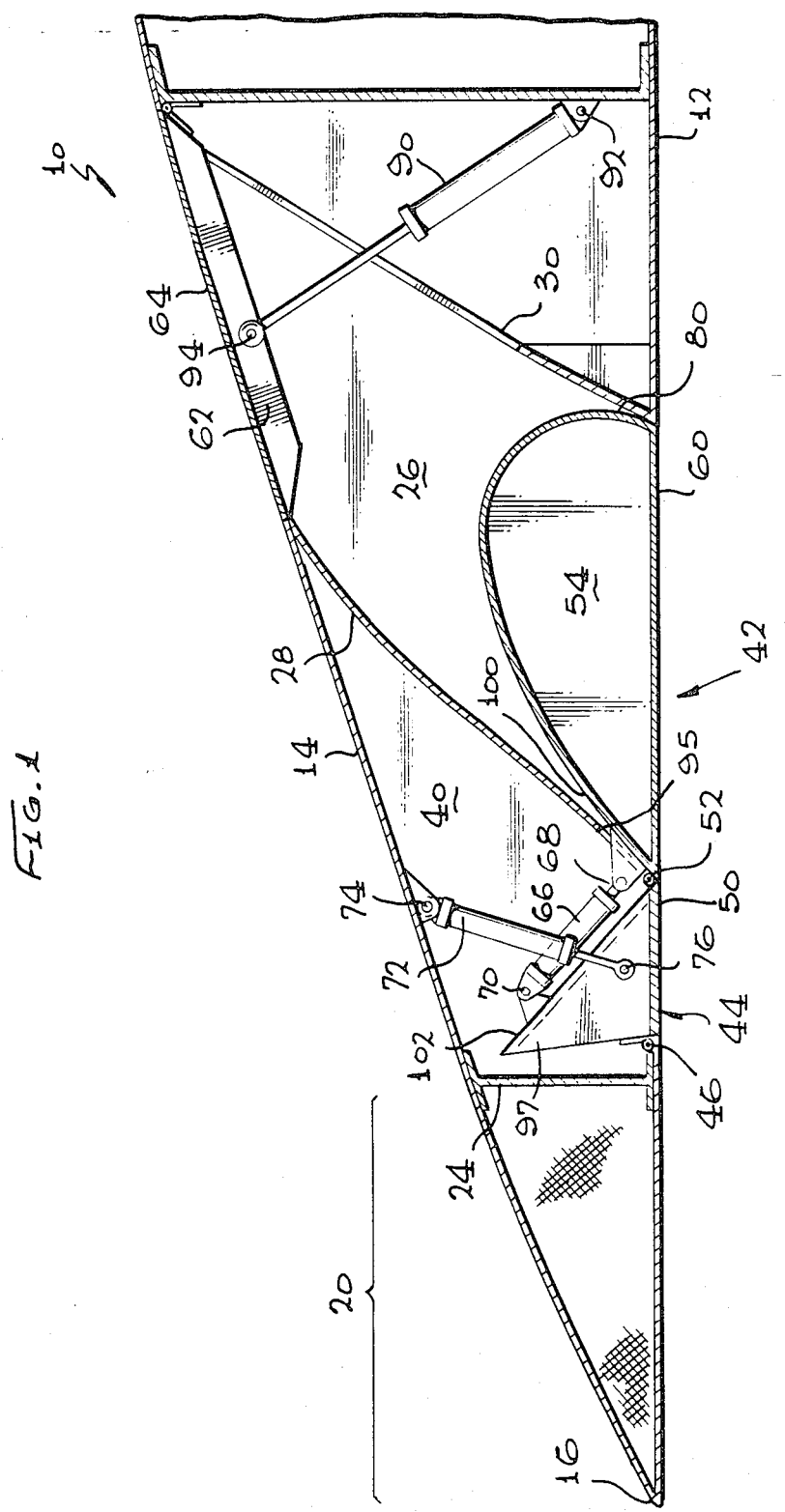

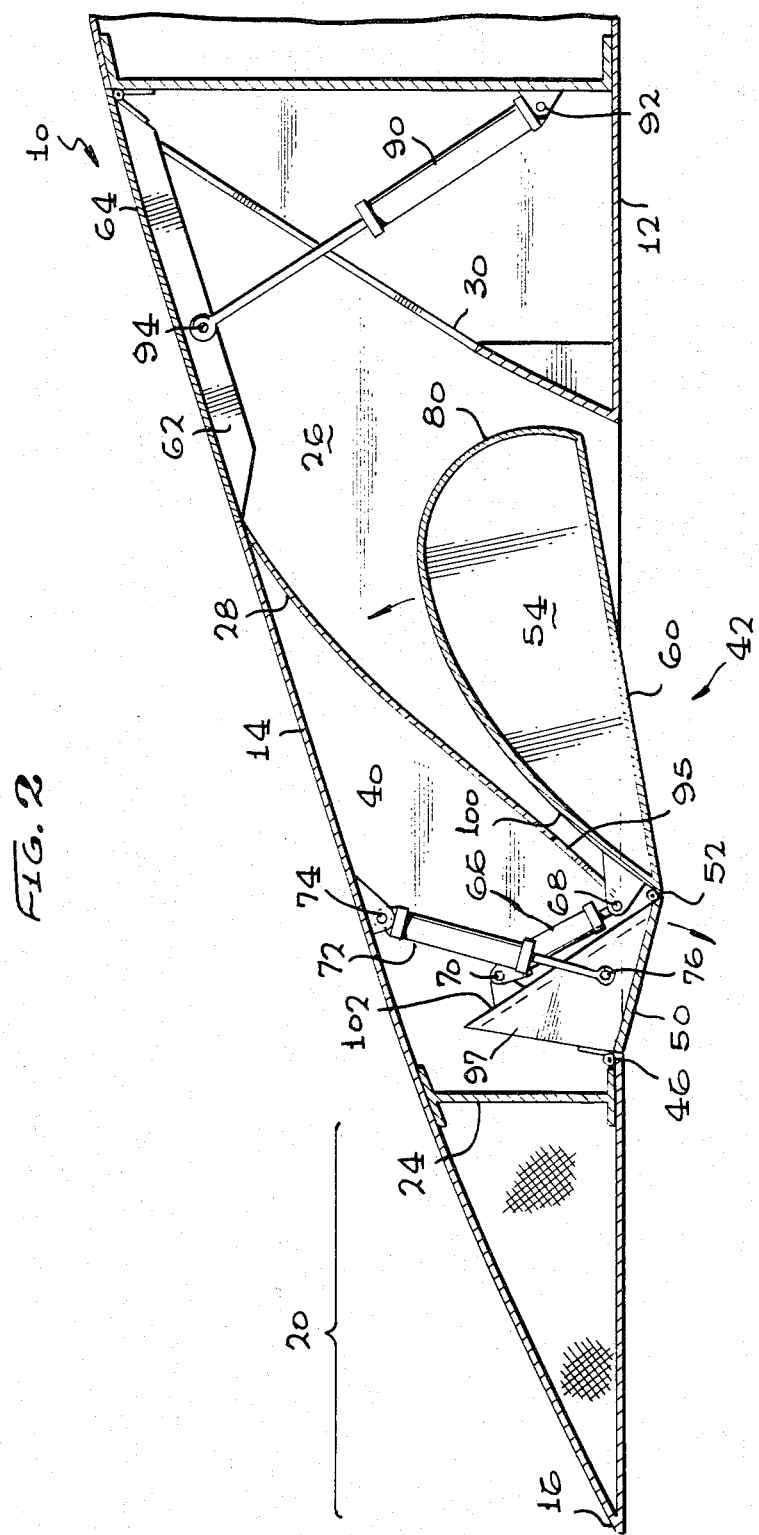

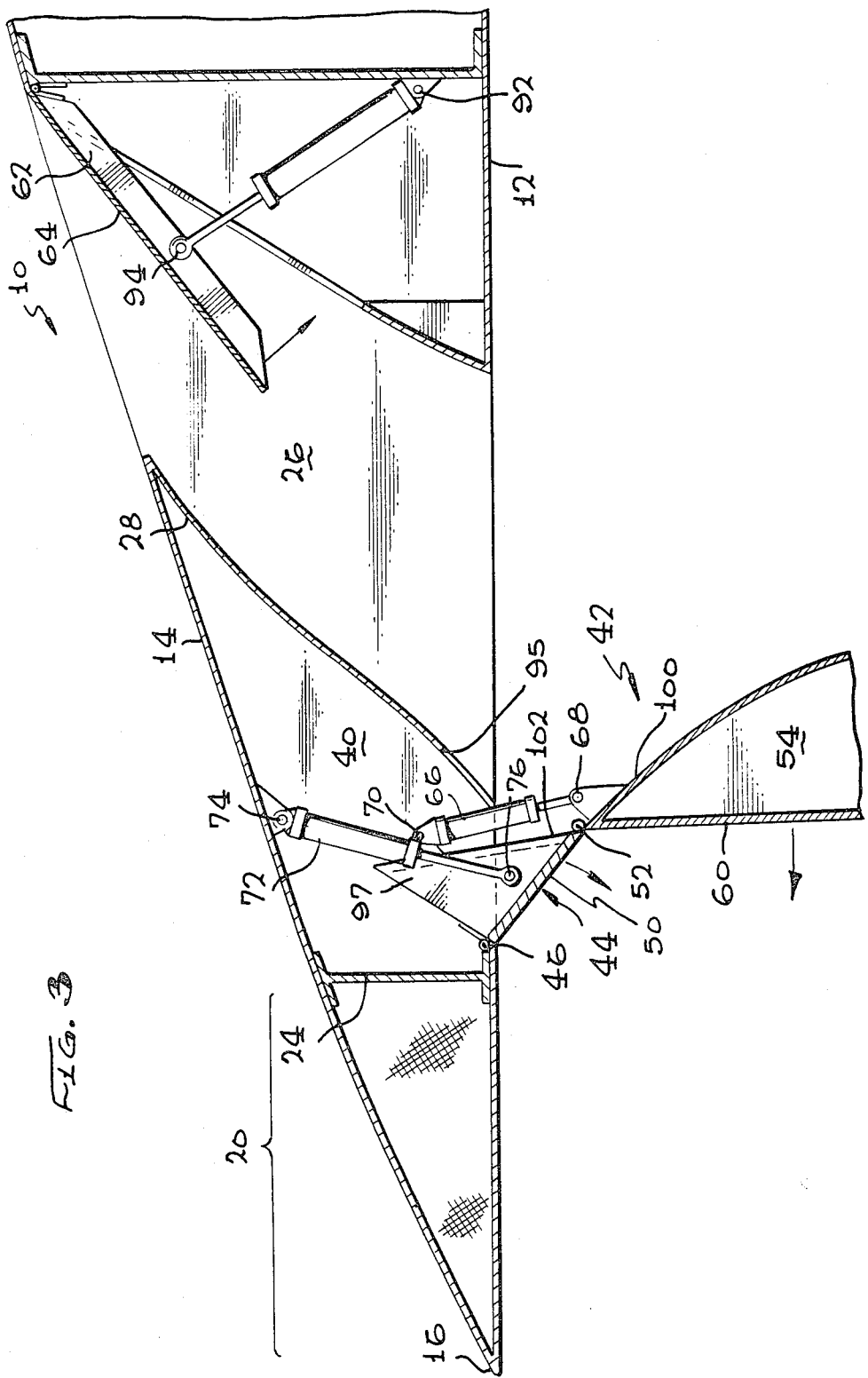

LEADING EDGE FLAP AND BOUNDARY LAYER CONTROL SYSTEM

TECHNICAL

The invention relates to the field of wings for aircraft and in particular to a leading edge flap and boundary layer control system for a wing.

BACKGROUND ART

The lift of a wing, in part, is proportional to its coefficient of lift, its area, and the square of its velocity as it moves through the air. Thus, at cruising speed, the wing area and the coefficient of lift required to maintain the aircraft's altitude is considerably less than that required at takeoff or for slow approach landing speeds. Sizing the wing for these latter conditions, which exist for only a relatively brief period during a flight, would result in gross inefficiencies during the rest of the flight regime. In such a case, the aircraft would carry the excess weight of the larger wing throughout the flight and would be subjected to a large drag penalty because of the greater wing surface area. The end results would be a reduced payload and higher fuel consumption.

This problem has been solved in the past by incorporating into the wing devices such as leading and trailing edge flaps which can be extended as required, thereby effectively increasing both the wing area and the coefficient of lift by increasing the mean camber line of the wing.

The introduction of new aircraft having wings with sharp leading edges, a significant amount of space behind the leading edge being reserved for incorporation of special material, and the need for leading edge boundary layer control have made the designing of wings more difficult. Prior art systems basically have not been able to meet these additional design requirements.

For example, prior art systems such as disclosed in U.S. Pat. No. 3,556,439, "Method and High Lift Systems for Making an Aircraft Wing more Efficient for Takeoff and Landings," by Charles P. Autrey, et al, provide a large increase in wing area and camber by extending and drooping the front portion of the wing and further extending a three-segment leading edge flap downwardly and forwardly of the leading edge. While having the advantages noted above, such designs have the disadvantage of being extremely complicated and the actuator system occupies the leading edge portion of the wing.

In order to reduce the volume occupied by a multisegment leading edge flap, past designs have attempted to make use of a portion of the bottom surface of the wing as a flap segment. For example, U.S. Pat. No. 3,504,870, "Aircraft Wing Variable Camber Leading Edge Flap," by J. B. Cole, et al, uses a relatively flat portion of the bottom surface of the wing which extends forwardly and downwardly from the leading edge. The flat portion is then warped into an aerodynamic surface by a sophisticated linkage system. While this design reduces the volume occupied by the leading edge flap, it still requires a complex actuation mechanism which intrudes into the leading edge portion of the wing.

It is also a desirable feature to have some form of boundary layer control typically provided by ejecting air over the top surface of the wing. This assures that at any given speed the boundary layer does not separate until a much higher angle of attack and higher coefficient of lift are reached.

U.S. Pat. No. 3,831,886, "Airfoil with Extrudable and Retractable Leading Edge" by Burgess, et al, design provides for boundary layer control. But the very fact that the leading edge is translated forward requires a flexible connection between the leading edge and the air supply ducts. This has disadvantages in that such flexible connections are subject to fatigue failure.

Other patents of interest are U.S. Pat. No. 4,285,482, "Wing Leading Edge High Lift Device," by D. S. Lewis, U.S. Pat. No. 4,099,691, "Boundary Layer Control System for Aircraft," by E. W. Swanson, et al, and U.S. Pat. No. 4,398,688, "Leading Edge Flap for an Airfoil," by A. L. William, all of which incorporate actuating mechanisms in the leading edge portion of the wing.

From the foregoing, it can be seen that it is a primary object of this invention to provide a leading edge flap for a wing having a sharp leading edge that can be stored within the wing in a minimal space when retracted. This is accomplished while still providing, when the flap is extended, an increase in wing area and camber, as well as a larger effective leading edge radius.

It is another object of this invention to provide a leading edge flap that can be stored a significant distance from the leading edge of the wing.

It is also an object of this invention to provide a leading edge flap having a simplified actuation system, with all hinge brackets and actuators being located inside the wing contour.

A still further object of this invention is to provide a leading edge flap system having provisions for boundary layer control.

DISCLOSURE OF INVENTION

The invention is a leading edge flap and boundary layer control system for an aircraft wing having a substantially sharp leading edge. The system comprises the wing incorporating a spanwise slot, the slot located a discrete distance from the leading edge extending from the lower aerodynamic surface to the upper aerodynamic surface, having front and rear guide walls. A guide member is rotatably mounted in the wing movable from a retracted position to an extended position. The guide member has a first aerodynamic surface defining a first portion of the lower aerodynamic surface when the guide member is in the retracted position and a second aerodynamic surface adapted to act as an inlet guide for the front guide wall of the slot when the guide member is in the extended position.

A flap segment is rotatably mounted to the guide member and is movable from a retracted position to an extended position in conjunction with the guide member. The flap member incorporates a first aerodynamic surface forming a second portion of the lower aerodynamic surface of the wing when the flap segment is in the retracted position. The flap segment in the retracted position also serves as a cover for the bottom of the slot. The flap segment also incorporates a second aerodynamic surface adapted to form an aerodynamic extension of the leading edge of the wing and, furthermore, cooperating with the second aerodynamic surface of the guide member to form a smooth transition inlet to the front guide wall of the slot. Actuation means are provided to actuate the guide member and flap segment from their retracted positions to their extended positions.

A door member is rotatably mounted to the rear wall of the slot moveable from an extended position to a retracted position. The door member having an upper surface forming a portion of the upper aerodynamic surface and covering the top of the slot when in the extended position. A second actuation means is provided to move the door member to the retracted position where it forms a portion of the rear wall of the slot.

Thus, during normal flight conditions the sharp leading edge and smooth aerodynamic contour is maintained. For landing and takeoff purposes, the flap segment and guide member are extended and the door member is retracted producing an aerodynamic extention of the leading edge and a smooth entrance to the slot is provided for energizing the boundary layer near the leading edge.

The novel features which are believed to be characteristic of the invention, both as to its organization and its method of operation, together with further objects and advantages thereof, will be better understood from the following description, taken in connection with the accompanying drawings in which a presently preferred embodiment of the invention is illustrated by way of example. It is to be expressly understood, however, that the drawings are for purposes of illustration and description only and are not intended as a definition of the limits of the invention.

BRIEF DESCRIPTION OF DRAWINGS

Illustrated in FIG. 1 is a partial cross-sectional side elevation view of the wing of the aircraft showing the leading edge flap in the retracted position.

Illustrated in FIG. 2 is a partial cross-sectional side elevation of the wing with the flap segment in the first stage of extension.

Figure 9:
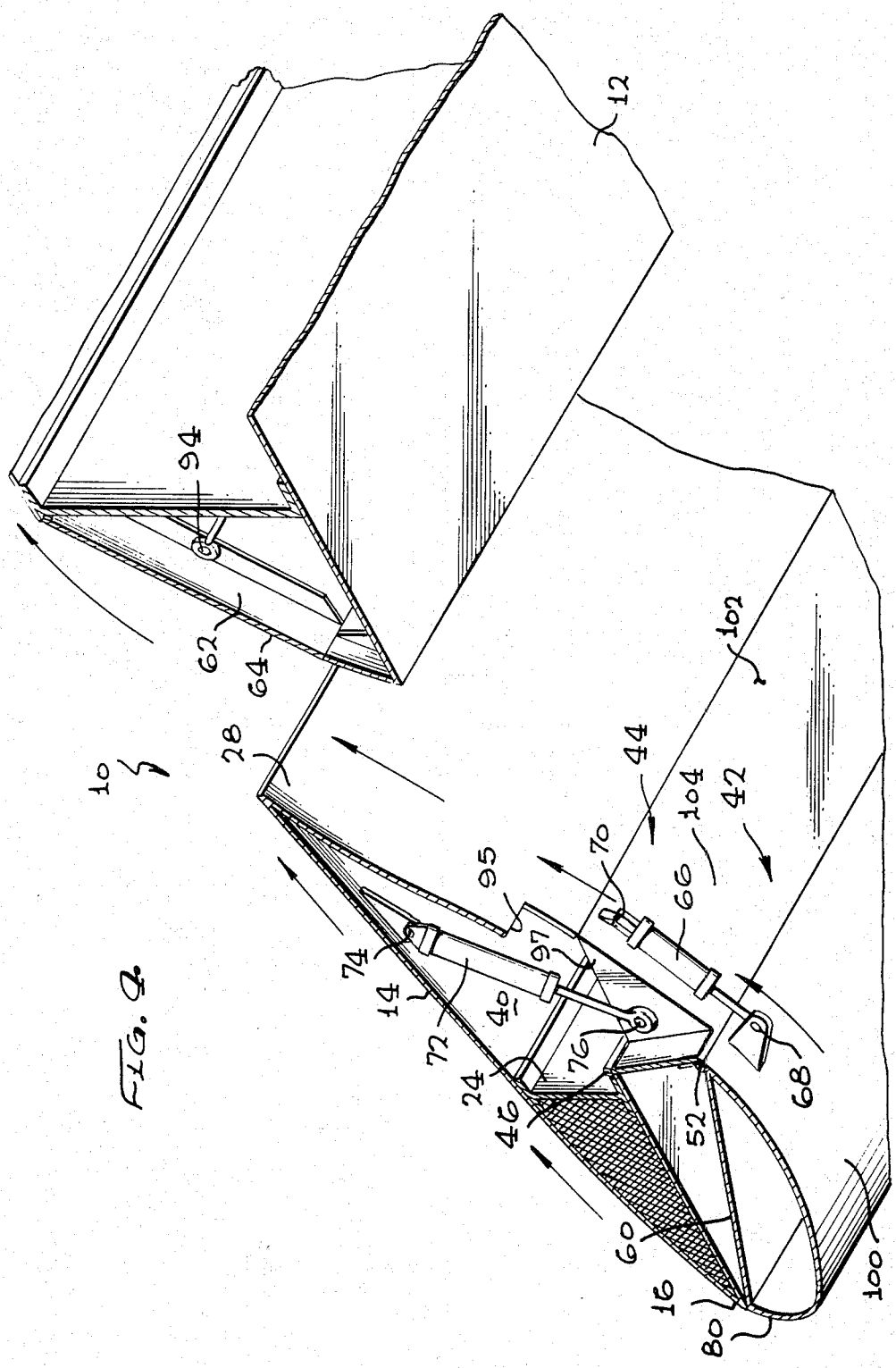

Illustrated in FIG. 3 is a partial side elevation cross-sectional view of the wing showing the flap segment in the middle of its extensional cycle.

Illustrated in FIG. 4 is a partial perspective view of the wing showing the flap segment in the fully extended position.

BEST MODE FOR CARRYING OUT THE INVENTION

Referring to FIG. 1 it can be seen that the wing generally designated by numeral 10 has a lower aerodynamic surface 12 and an upper aerodynamic surface 14 with a sharp leading edge 16. The leading edge section of the wing, designated by numeral 20, incorporates special materials, thus requiring that any high lift device be mounted significantly aft of the leading edge 16. Typically, the section 20 terminates in a spanwise spar 24. Incorporated in the wing 10 is a spanwise duct, generally designated by numeral 26, defined by a front wall 28 and a rear wall 30. The front wall 28 of the duct 26 and the spar 24 define a spanwise cavity 40.

Still referring to FIG. 1 and additionally to FIGS. 2-4, it can be seen that the leading edge flap assembly, designated by numeral 42, comprises a generally triangular shaped guide member 44 mounted within the cavity 40 when in the retracted position. The guide member 44 is rotatably mounted to the wing by means of a piano type hinge 46 attached to the spar 24. The bottom surface 50 of the guide member 44 is configured to form a first portion of the lower aerodynamic surface 12 of the wing 10 when in the retracted position (as shown in FIG. 1).

Rotatably mounted to the guide member 44 by means of a second piano type hinge 52 is a flap segment 54. The flap segment 54 when in the retracted position, as illustrated in FIG. 1, has an aerodynamic surface 60 configured to form a second portion of the lower aerodynamic surface 12 of the wing 10 and also forms a lower cover for the duct 26.

Rotatably mounted to the rear wall 30 of the duct 26 is a cover member 62 having an upper surface 64 which forms a portion of the upper aerodynamic surface 14 when the cover member 62 is in its extended position (as illustrated in FIG. 1).

An actuator 66 typically hydraulic, is rotatably mounted at its first end 68 to the flap segment 54 and at its second end 70 rotatably mounted to guide member 44. A second actuator, again preferably hydraulic, designated by numeral 72, is rotatably mounted at its first end 74 to the wing structure and at its second end 76 rotatably mounted to guide member 44. These two hydraulic actuators 66 and 72 form an actuation means to extend the flap segment 54 and guide member 44 as illustrated in FIG. 4 in a manner to be subsequently described.

It can be seen that in order to make a close or flush contact between the flap segment 54 and the rear wall 30 of the duct 26, the contour of the bulbus edge portion 80 of the flap segment 54 should mate with the contour of the rear wall 30 of duct 26. Thus, in order to extend the flap segment 54 it is necessary to first extend the actuator 72 slightly allowing actuator 66 to partially compress so that the guide member 44 and the flap segment 54 are pulled to the position as indicated in FIG. 2. At this point the actuator 66 and 72 can be extended causing the guide member 44 and flap segment 54 to extend to the position as indicated in FIG. 3. Further extention of the actuators 72 and 66 will rotate the guide member 44 and the flap segment 54 to the position as illustrated in FIG. 4.

A third actuator 90 is rotatably attached at its first end 92 to wing structure and rotatably mounted at its second end 94 to the cover 62. Simultaneously with or after the movement of the guide member and flap segment the cover 62 is retracted to the position illustrated in FIG. 4 where it becomes a portion of the rear wall 30 of the duct 26.

It should be noted that in order to provide for the necessary movement of the hydraulic actuator 66 and 72, a notch 95 is provided in the front wall 28 of the duct 26. Additionally, a notch portion 97 is provided in the member 44 to accommodate end 76 of the hydraulic cylinder 72.

In order to obtain maximum aerodynamic efficiency when the flap segment 54 is in the extended position the curvature of the bulbus end portion 80 is such that it becomes tangent to the leading edge 16 of the wing, thus providing a smooth uninterrupted contour. Furthermore, the rear portion 100 of the flap segment 54 is configured so as to be tangent to the contour of the surface 102 of the guide member 44. Additionally, the end portion 104 of the surface 102 is adapted to be tangent to the entrance portion of the forward wall 28 of the duct 26.

When the flap segment 54 is extended and the duct 26 is open the bulbus end portion 80 of the flap segment 54 combines with the leading edge 16 of the wing to provide an increase in lift by increasing the camber and total planform area of the wing. Additionally, the flap segment 54 and surface 102 of the guide member 44 provides a smooth entrance of air into the duct 26. Air entering through the duct flows to the upper surface 14 of the wing energizing the boundary layer further increasing the lift for landing and takeoff purposes.

While the leading edge flap and boundary layer control system has been described with reference to a particular embodiment, it should be understood that such an embodiment is merely illustrative as there are numerous variations and modifications which may be made by one skilled in the art. Thus, the invention is to be construed as being limited only by the spirit and scope of the appended claims.

INDUSTRIAL APPLICABILITY

The leading edge flap and boundary layer control system is useful on aircraft to provide increased lift during takeoff and landing.

I claim:

1. A leading edge flap and boundary layer control system for an aircraft wing having a substantially sharp leading edge, said system comprising:
    said wing having a spanwise slot having front and rear guide walls, said slot located a discrete distance from said leading edge extending from the lower aerodynamic surface to the upper aerodynamic surface of said wing;
    a guide member rotatably mounted to said wing movable from a retracted position to an extended position, said guide member having a first aerodynamic surface defining and acting as a first portion of said lower aerodynamic surface when said guide member is in said retracted position and a second aerodynamic surface adapted to act as an entrance guide for said front guide wall of said slot when said guide member is in said extended position;
    a flap segment rotatably mounted to said guide member movable from a retracted position to an extended position in conjunction with said movement of said guide member, said flap member having a first aerodynamic surface forming a second portion of said lower aerodynamic surface of said wing when said flap segment is in said retracted position, said flap segment having a second aerodynamic surface adapted to form an aerodynamic extension of said leading edge and cooperating with said second aerodynamic surface of said guide member to form a smooth transition inlet to said slot when in said extended position;
    first actuation means adapted to move said guide member and said flap segment from said retracted positions to said extended positions;
    a door member rotatably mounted to said wing adapted to rotate from an extended position to a retracted position, said door member having an upper surface adapted to form a portion of said upper aerodynamic surface of said wing when in said extended position, and to form a portion of said rear wall of said slot when in said retracted position; and
    second actuation means coupled to said wing and to said door member adapted to move said door member from said extended position to said retracted position.

2. The system as set forth in claim 1 wherein said first acuation means comprises:
    a first hydraulic actuator rotatably mounted at its first end to said wing and at its second end to said guide member; and
    a second hydraulic actuator rotatably mounted at its first end to said guide member and it is second end to said flap segment.

3. The system as set forth in claim 2 wherein said second actuation means comprises a third hydraulic actuator rotatably mounted at its first end to said wing and at its second end to said door member.

4. The system as set forth in claim 3 wherein said flap segment serves as a cover for the bottom of said slot when in said retracted position.

5. The system as set forth in claim 4 wherein said first aerodynamic surface of said flap segment covers said slot and said second aerodynamic surface is stored within said slot when said flap segment is in said retracted position.

6. A leading edge flap and boundary layer control system for an aircraft wing having a substantially sharp edge, said system comprising:
    said wing having a spanwise slot said slot having front and rear guide walls, said slot located a discrete distance from said leading edge extending from the lower aerodynamic surface to the upper aerodynamic surface of said wing;
    a guide member rotatably mounted to said wing movable from a retracted position stored within said slot to an extended position, said guide member having a first aerodynamic surface defining and acting as a first portion of said lower aerodynamic surface when said guide member is in said retracted position and a second aerodynamic surface adapted to act as an entrance guide for said front guide wall of said slot when said guide member is in said extended position;
    a flap segment rotatably mounted to said guide member movable from a retracted position to an extended position in conjunction with said movement of said guide member, said flap member having a first aerodynamic surface forming a second portion of said lower aerodynamic surface of said wing covering said slot when said flap segment is in said retracted position, said flap segment having a second aerodynamic surface adapted to be stored within said slot when said flap segment is in said retracted position and to form an aerodynamic extension of said leading edge and cooperating with said second aerodynamic surface of said guide member to form a smooth transition inlet to said slot when in said extended position;
    first actuation means adapted to move said guide member and said flap segment from said retracted positions to said extended positions;
    a door member rotatably mounted to said wing adapted to rotate from an extended position to a retracted position, said door member having an upper surface adapted to form a portion of said upper aerodynamic surface of said wing when in said extended position, and to form a portion of said rear wall of said slot when in said retracted position; and
    second actuation means coupled to said wing and to said door member adapted to move said door member from said extended position to said retracted position.

* * * * *